(12) United States Patent
Chow (10) Patent No.: US 10,733,891 B2
(45) Date of Patent: Aug. 4, 2020

(54) PARKING LOT ASSISTANT

(71) Applicant: Toyota Motor Engineering & Manufacturing North America, Inc., Plano, TX (US)

(72) Inventor: Justin J. Chow, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/181,193

(22) Filed: Nov. 5, 2018

(65) Prior Publication Data

US 2020/0143682 A1 May 7, 2020

(51) Int. Cl.
G08G 1/14 (2006.01)
G08G 1/01 (2006.01)
G01C 21/36 (2006.01)

(52) U.S. Cl.
CPC ............. *G08G 1/143* (2013.01); *G01C 21/36* (2013.01); *G08G 1/0137* (2013.01)

(58) Field of Classification Search
CPC ....... G08G 1/143; G08G 1/0137; G01C 21/36
See application file for complete search history.

(56) References Cited

U.S. PATENT DOCUMENTS

| | | | |
|---|---|---|---|
| 6,970,101 B1 | 11/2005 | Squire et al. | |
| 7,671,763 B1 * | 3/2010 | Riffel | G01S 5/0072 340/426.19 |
| 7,834,778 B2 * | 11/2010 | Browne | G08G 1/143 340/932.2 |
| 8,063,797 B1 * | 11/2011 | Sonnabend | G06K 9/00791 340/932.2 |
| 8,090,402 B1 * | 1/2012 | Fujisaki | H04N 1/00127 455/556.1 |
| 8,447,463 B1 | 5/2013 | Chowdhary et al. | |
| 8,963,740 B2 | 2/2015 | Koukoumidis et al. | |
| 8,976,063 B1 | 3/2015 | Hawkins et al. | |
| 9,076,336 B2 | 7/2015 | Tippelhofer et al. | |
| 9,177,475 B2 | 11/2015 | Sellschopp | |
| 9,230,440 B1 | 1/2016 | Penilla et al. | |
| 9,299,256 B2 | 3/2016 | Chen et al. | |

(Continued)

FOREIGN PATENT DOCUMENTS

CN 105513414 4/2016

*Primary Examiner* — Joseph H Feild
*Assistant Examiner* — Rufus C Point
(74) *Attorney, Agent, or Firm* — Snell & Wilmer LLP (57) ABSTRACT

A system for assisting parking of a vehicle includes a main body to support at least one driver or passenger, and a sensor to detect adjacent structure data corresponding to an adjacent vehicle or structure adjacent to the main body. The system further includes a network access device to transmit and receive data including receiving a parking assist request from a remote device corresponding to a request to locate the main body, and an electronic control unit (ECU) coupled to the sensor and the network access device. The ECU is designed to receive the parking assist request from the network access device. The ECU is further designed to control the network access device to transmit parking location information to the remote device in response to receiving the parking assist request, the parking location information corresponding to the adjacent vehicle or structure adjacent to the main body.

14 Claims, 7 Drawing Sheets

(56) References Cited

U.S. PATENT DOCUMENTS

| | | | |
|---|---|---|---|
| 9,576,250 B2 | 2/2017 | de Souza et al. | |
| 9,721,470 B2 | 8/2017 | Akavaram et al. | |
| 9,810,542 B2 | 11/2017 | Mays et al. | |
| 9,812,015 B1 | 11/2017 | Cox et al. | |
| 9,830,819 B2 | 11/2017 | Levy et al. | |
| 10,001,380 B2 | 6/2018 | Annapureddy et al. | |
| 10,106,153 B1* | 10/2018 | Xiao | B60W 30/06 |
| 10,520,329 B2* | 12/2019 | Kim | G06K 9/00771 |
| 2003/0074129 A1* | 4/2003 | Curbow | G01C 21/26 701/523 |
| 2006/0220911 A1* | 10/2006 | Jaupitre | G08G 1/14 340/932.2 |
| 2007/0040701 A1* | 2/2007 | Browne | G08G 1/14 340/932.2 |
| 2010/0060485 A1* | 3/2010 | Kim | G08G 1/143 340/932.2 |
| 2010/0171642 A1* | 7/2010 | Hassan | G01C 17/38 340/992 |
| 2012/0139757 A1* | 6/2012 | Ji | G08G 1/143 340/932.2 |
| 2013/0057686 A1* | 3/2013 | Genc | B60R 1/00 348/148 |
| 2013/0176147 A1* | 7/2013 | Anderson | G08G 1/143 340/932.2 |
| 2014/0118549 A1* | 5/2014 | Meldrum | B60R 1/00 348/148 |
| 2014/0176348 A1* | 6/2014 | Acker, Jr. | G08G 1/144 340/932.2 |
| 2015/0130641 A1* | 5/2015 | Rahman | G08G 1/142 340/932.2 |
| 2017/0355307 A1* | 12/2017 | Ha | H04N 7/183 |
| 2018/0157267 A1* | 6/2018 | Gao | B60K 35/00 |
| 2018/0301031 A1* | 10/2018 | Naamani | G06K 9/00771 |
| 2018/0322349 A1* | 11/2018 | Hayakawa | G06T 7/62 |

* cited by examiner

PARKING LOT ASSISTANT

BACKGROUND

1. Field

The present disclosure relates to systems and methods for providing parking assistance to vehicles and to passengers of vehicles.

2. Description of the Related Art

Vehicles are becoming more capable of assisting drivers and users as technology advances. For example, some vehicles are now fully autonomous and capable of navigating roadways without human control. Some vehicles are partially autonomous with capabilities such as self-parking, warning drivers of potential accidents, etc. In order to provide this type of functionality, many vehicles include powerful logic devices (such as electronic control units (ECUs)), multiple sensors (such as cameras, radar sensors, light imaging and ranging (LIDAR) sensors, etc.), and communication devices (such as vehicle-to-vehicle or vehicle-to-remote-device network access devices). This technology allows for vehicles to provide powerful functions.

One area where vehicles fail to provide much help at the present time is aiding drivers in parking facilities. Although some autonomous and semi-autonomous vehicles may park themselves, many frustrations still exist with parking. Some of this frustration lies in the ability of drivers and users to find cars after they have been parked for a significant amount of time. For example, after a long trip, a user may have difficulty finding his car at an airport parking lot. Additional frustrations may occur with finding available parking spots in large parking decks. For example, a driver may spend a significant amount of time driving around a parking deck looking for an available space to park the vehicle. Additionally, the driver may not be aware of locations of available parking spots that suit his or her preferences and, thus, may occupy the first available spot that is found regardless of preferences. Even more frustrations may occur due to traffic in some parking locations. For example, a parking deck may have a significant amount of traffic immediately before a show begins or after a show ends.

Thus, systems and methods for aiding vehicle parking are desirable.

SUMMARY

Described herein is a system for assisting parking of a vehicle. The system includes a main body designed to support at least one driver or passenger. The system further includes a sensor designed to detect adjacent structure data corresponding to an adjacent vehicle or structure adjacent to the main body. The system further includes a network access device designed to transmit and receive data including receiving a parking assist request from a remote device corresponding to a request to locate the main body. The system further includes an electronic control unit (ECU) coupled to the sensor and the network access device. The ECU is designed to receive the parking assist request from the network access device. The ECU is further designed to control the network access device to transmit parking location information corresponding to the adjacent vehicle or structure to the remote device in response to receiving the parking assist request.

Also disclosed is a system for managing vehicle parking. The system includes a memory designed to store map data corresponding to a parking location and including multiple parking spots. The system further includes at least one sensor designed to detect parking data corresponding to presence of vehicles in the multiple parking spots. The system further includes a network access device designed to transmit and receive the detected parking data. The system further includes a processor coupled to the memory, the at least one sensor, and the network access device. The processor is designed to receive a first parking notification from a first vehicle via the network access device that the first vehicle is planning to park at the parking location. The processor is further designed to determine a first available parking spot based on the detected parking data. The processor is further designed to transmit first available parking location data corresponding to a first location of the first available parking spot based on the map data in response to receiving the first parking notification.

Also disclosed is a method for assisting parking of a vehicle. The method includes detecting, by a sensor of the vehicle, adjacent structure data corresponding to an adjacent vehicle or structure adjacent to a main body of the vehicle. The method further includes receiving, by a network access device of the vehicle, a parking assist request from a remote device corresponding to a request to locate the main body. The method further includes controlling, by an electronic control unit (ECU), the network access device to transmit parking location information corresponding to the adjacent vehicle or structure to the remote device in response to receiving the parking assist request.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for providing parking assistance. The systems provide several benefits and advantages such as assisting a driver or a user of a vehicle in finding the vehicle in a crowded parking location, such as a parking garage or street parking. The systems further learn driver preferences with regards to parking, and advantageously help a driver find a parking spot that best suits the preferences of the driver based on the learned preferences. Additionally, a parked vehicle can detect vacant parking spots and transmit their locations to other vehicles, advantageously allowing other vehicles to more quickly find vacant parking spots.

The systems can also be designed to provide benefits to multiple vehicles. For example, a system may advantageously keep track of vacant parking spots at a parking location. The same system may beneficially transmit locations of the vacant spots to incoming vehicles, thus saving time for those incoming vehicles. The system may also advantageously control incoming and outgoing traffic at the parking location, thus reducing traffic at the parking location and further saving time for drivers.

An exemplary system includes a vehicle, and may include a parking management server. The vehicle may include a location sensor to detect a current location of the vehicle along with one or more additional sensors such as a camera or a radar sensor. The vehicle may further include a network access device capable of communicating with remote devices. The vehicle may also include an electronic control unit (ECU). The ECU may learn parking preferences of the driver based on sensor data and may determine preferred parking locations for the driver based on the learned parking preferences. The ECU may also receive a message from a remote device, such as a cell phone, requesting aid in locating a parked vehicle. The ECU may control the network access device to transmit location data or other data (such as image data) to the remote device to aid the user in finding the vehicle.

The parking management server may include sensors, a processor, a memory, and a network access device. The memory may store a map of a parking location, and the sensors may determine which parking spots are occupied and which are vacant. The processor may control the network access device to broadcast or otherwise transmit messages indicating which parking spots are available to aid incoming vehicles in quickly finding available parking. The processor may further determine entrance and exit points for vehicles within the parking location in order to reduce traffic at the parking location.

Figure 1:
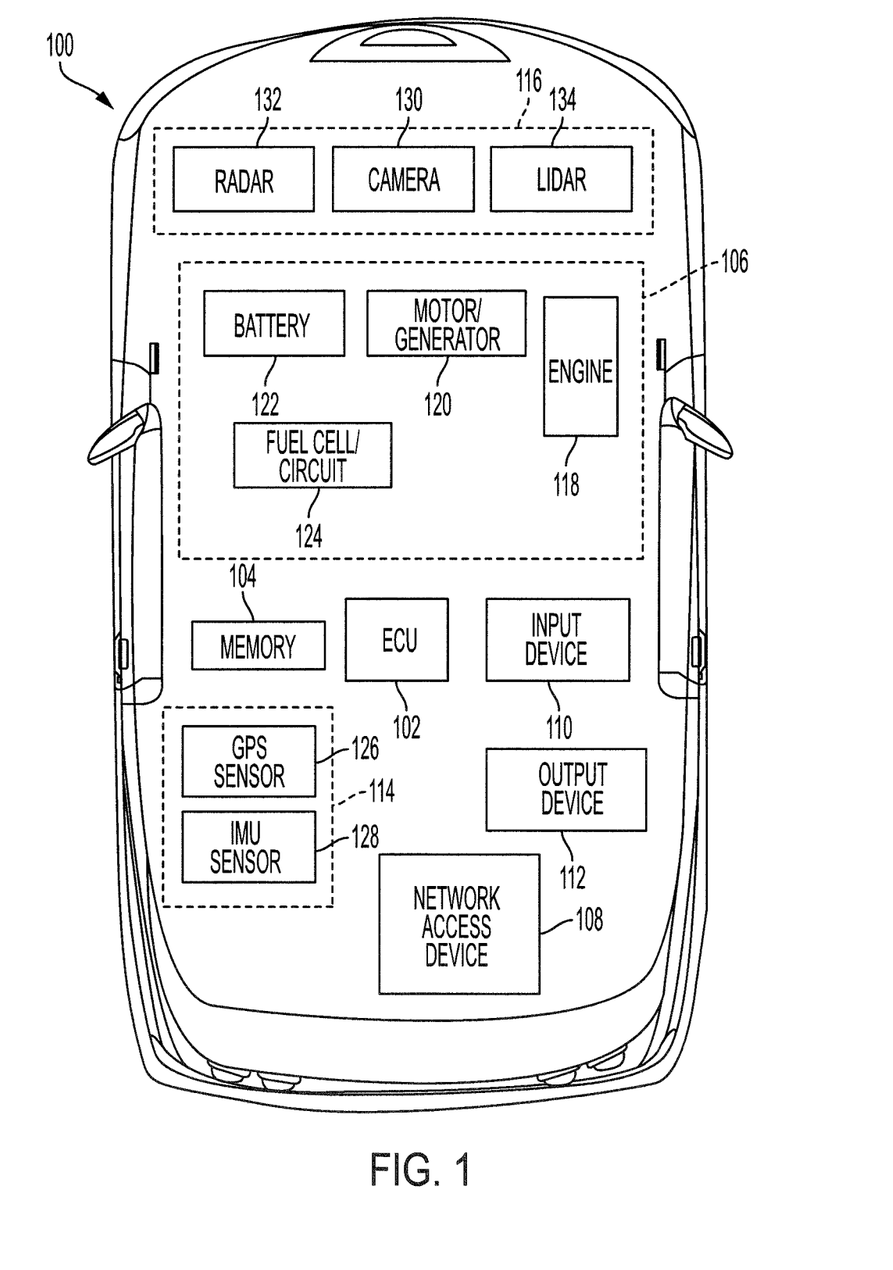
FIG. 1 is a block diagram illustrating a vehicle having features for providing parking assistance according to an embodiment of the present invention.

Turning to FIG. 1, a vehicle 100 may be designed to provide parking assistance for itself, passengers, or drivers. The vehicle 100 may include an ECU 102, a memory 104, a power source 106, a network access device 108, an input device 110, and an output device 112. The vehicle 100 may further include one or more location sensor 114 and one or more additional sensor 116.

The vehicle 110 may be propelled along a roadway, may be suspended in or on water, or may fly through air. The vehicle 110 may resemble a car, motorcycle, boat, aircraft, or the like. The vehicle 110 may further support an individual such as a driver, passenger, or the like, who may be located in a passenger compartment.

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operation of components based on the determinations.

The vehicle 100 may be fully autonomous or semi-autonomous. In that regard, the ECU 102 may control various aspects of the vehicle 100 (such as steering, braking, accelerating, or the like) to maneuver the vehicle 100 from a starting location to a destination location. In some embodiments, the vehicle 100 may be used as a rideshare vehicle, in an autonomous, semi-autonomous, or fully driver-operated state. In that regard, the vehicle 100 may be operated independently of driver control and, occasionally, without a person inside of the passenger compartment 110. In some embodiments, the vehicle 100 may be partially autonomous and be driven between locations by a driver, and the ECU 102 may control parking operations of the vehicle 100.

The memory 104 may include any non-transitory memory and may be capable of storing data usable by the ECU 102. For example, the memory 104 may store instructions usable by the ECU 102 to park the vehicle, may store previous locations of the vehicle 100, may store parking preferences of a driver or rider, or the like.

The power source 106 may include any one or more of an engine 118, a motor-generator 120, the battery 122, or a fuel-cell circuit 124. The engine 118 may convert a fuel into mechanical power for propelling the vehicle 100. In that regard, the engine 118 may be a gasoline engine, a diesel engine, or the like.

The battery 122 may store electrical energy. In some embodiments, the battery 122 may include any one or more energy storage device including a battery, a flywheel, a super capacitor, a thermal storage device, or the like.

The fuel-cell circuit 124 may include a plurality of fuel cells that facilitate a chemical reaction to generate electrical energy. For example, the fuel cells may receive hydrogen and oxygen, facilitate a reaction between the hydrogen and oxygen, and output electricity in response to the reaction. In that regard, the electrical energy generated by the fuel-cell circuit 124 may be stored in the battery 122 and/or used by the motor-generator 120. In some embodiments, the vehicle 100 may include multiple fuel-cell circuits including the fuel-cell circuit 124.

The motor-generator 120 may convert the electrical energy stored in the battery 122 (or electrical energy received directly from the fuel-cell circuit 124) into mechanical power usable to propel the vehicle 100. The motor-generator 120 may further convert mechanical power received from the engine 118 or from wheels of the vehicle 100 into electricity, which may be stored in the battery 122 as energy and/or used by other components of the vehicle 100. In some embodiments, the motor-generator 120 may include a motor without a generator portion and, in some embodiments, a separate generator may be provided.

The network access device 108 may include any port or device capable of communicating via a wired or wireless interface such as via Wi-Fi, Bluetooth, a cellular protocol, vehicle to vehicle communications, or the like. For example, the ECU 102 may control the network access device 108 to communicate with a cloud, an external vehicle, a server, or one or more remote device.

The input device 110 may include any device capable of receiving user input from a user or driver of the vehicle. For example, the input device 110 may include a keyboard, a touchscreen, a microphone, or the like.

The output device 112 may include any device capable of outputting data to a user or driver of the vehicle. For example, the output device 112 may include a speaker, a display, a touchscreen, or the like.

The location sensor 114 may include any one or multiple sensors capable of determining a current location, heading, and/or orientation of the vehicle 100. For example, the location sensor 114 may include one or more of a global positioning system (GPS) sensor 126 or an inertial measurement unit (IMU) sensor 128. The GPS sensor 126 may be capable of detecting location data corresponding to a location of the vehicle 100. The IMU sensor 128 may include, for example, an accelerometer, a gyroscope, or other inertial measurement device and may be capable of detecting a velocity, acceleration, orientation, or the like of the vehicle 100.

The sensor 116 may include any one or more sensor designed to detect adjacent object data corresponding to a location or object located within a vicinity of the vehicle 100. In that regard, the sensor 116 may be referred to as an adjacent object sensor. In some embodiments, the vehicle 100 may include multiple adjacent object sensors positioned around a body of the vehicle 100 such that the ECU 102 may receive adjacent object data corresponding to multiple sides of the vehicle 100. For example, the vehicle 100 may include one or more adjacent object sensor 116 located on a front, a back, and both sides of the vehicle 100.

The sensor 116 may include any one or more of a camera 130, a radar sensor 132, a light detection and ranging (LIDAR) sensor 134, or any other proximity, distance, or other object sensor. The camera may detect image data within a predetermined distance or range of the vehicle 100. The radar sensor may detect the presence of objects within a predetermined distance or range of the vehicle 100. The LIDAR sensor may likewise detect the presence of objects within a predetermined distance or range of the vehicle 100. The predetermined distance or range for each of the sensors 116 may correspond to a distance or range within which it is determined that information is desirable.

The camera 130 may detect additional data corresponding to the environment. For example, the camera 130 may detect text data on a sign in a parking garage or on a street sign. The data may include rules related to parking such as parking lot hours of operation, special rules related to a parking location (such as permit-only parking after 8 PM), or the like.

The vehicle 100 may be designed to assist in various types of parking situations. For example, a driver (or rider) of the vehicle 100 may leave the vehicle parked at a parking location for an extended period of time. Upon returning to the vehicle 100, the driver may fail to recall the specific parking spot at which the vehicle 100 is parked. The driver may transmit a message to the vehicle using a remote device, which may be received by the network access device 108. Upon receiving the message, the ECU 102 may transmit a message back to the remote device that includes a specific location, as detected by the location sensor 114, a specific location as stored in the memory 104 (such as on a map), or data corresponding to objects in the vicinity of the vehicle 100 (as detected by the sensor 116). For example, upon entering the parking location, the ECU 102 may cause the memory 104 to store a floor and general location of the vehicle 100 on the floor. The ECU may transmit this information, along with images of objects or other vehicles near the vehicle 100, to the remote device in order to aid the driver in finding the vehicle.

As another example, as the vehicle 100 is parked multiple times, the ECU 102 may learn preferences of the driver. These preferences may include, for example, a preference to park in handicapped spots, a preference to not walk up or down stairs, or a preference to park as close to an entrance as possible. This information may be stored in the memory 104. The memory 104 may further store (or receive) map information corresponding to a specific parking location (such as a parking deck) as well as vacancy information (such as from a server and including which parking spots are vacant). The ECU 102 may select an ideal parking spot for the vehicle 100 to park based on the preferences, the map, and the vacancy information. The ECU 102 may further provide a location (or driving directions to the location) of the ideal parking spot.

As yet another example, the driver may provide preference information to the ECU 102 via the input device 110. The preference information may include a preference to remain parked for a predetermined amount of time, whether the driver carries a permit to park in a predetermined type of parking spot, whether the driver is willing to pay a premium for a better parking spot, or the like. The camera 130 may detect image data corresponding to parking rules (such as hours of operation of a parking location or whether a permit is required). In some embodiments, the network access device 108 may receive this parking rule information from a remote device (such as a server associated with the parking location). Based on the parking rule information and the driver preference information, the ECU 102 may select an ideal parking spot, and may output information (such as a location) corresponding to the ideal parking spot.

In some embodiments, a server may collect data regarding which parking spots are occupied or vacant based on sensor data. The sensors may be associated with specific parking spots (or a specific parking location) or may be associated with other vehicles parked in the parking location. For example, once parked, the vehicle 100 may transmit to a server (via the network access device 108) information indicating which parking spot the vehicle 100 is parked in. The vehicle 100 may further transmit adjacent vehicle information indicating whether vehicles are parked in spots next to the current parking spot (e.g., based on data detected by the sensor 116). The adjacent vehicle information may be used by a server or another vehicle to identify vacant parking spots.

Figure 2:
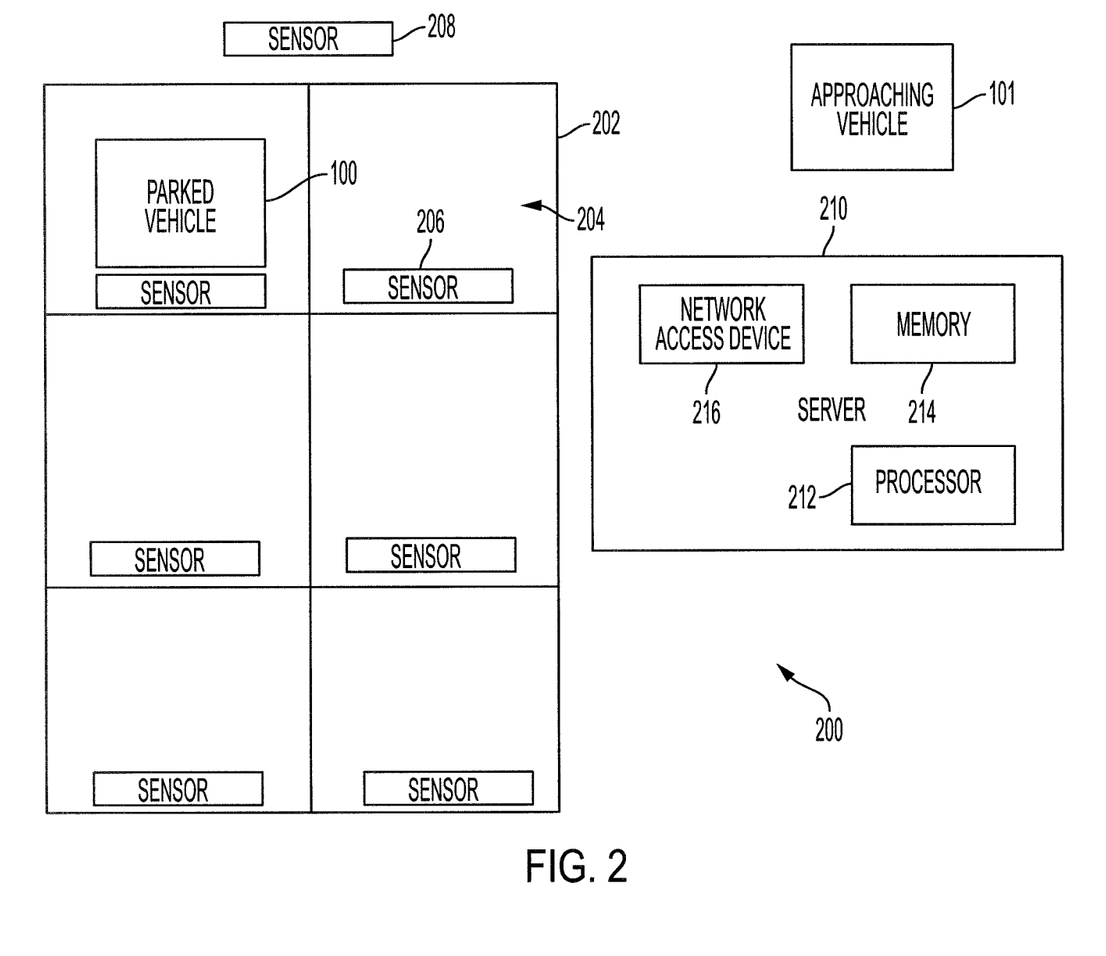
FIG. 2 is a block diagram illustrating a system for providing parking assistance to multiple vehicles according to an embodiment of the present invention.

Turning now to FIG. 2, a system 200 for providing parking assistance to vehicles is provided. The system 200 may include the vehicle 100 along with other vehicles 101 having similar features as the vehicle 100 of FIG. 1. The system 200 may be implemented at a parking location 202. The parking location 202 may include a plurality of parking spots 204. For example, the parking location 202 may include a parking lot, a parking deck, street parking (with or without parking meters), or the like.

The system 200 may include a plurality of sensors 206. The sensors 206 may include a sensor located at each of the parking spots 204 or one sensor for multiple parking spots 204. The sensors 206 may detect the presence of vehicles parked in one or more of the parking spots 204. For example, the sensors 206 may include a camera, a proximity sensor, a radar sensor, a LIDAR sensor, an inductive sensor, or any other sensor capable of detecting the presence of a vehicle parked in one or more of the parking spots 204.

The system 200 may further include a sensor 208 designed to detect the presence of vehicles in multiple parking spots 204. For example, the sensor 208 may include a camera, a radar sensor, a LIDAR sensor, or any other sensor capable of detecting the presence of a vehicle parked in one or more of the parking spots 204.

The vehicle 100 may likewise include a sensor (such as the sensor 116 of FIG. 1) that may detect the presence of a vehicle parked in one or more of the parking spots 204 that are parked adjacent to the vehicle 100.

The system 200 may further include a server 210, such as a parking server. The server 210 may include a processor 212, a memory 214, and a network access device 216. The processor 212 may include any processor, controller, or other electronic device capable of performing logic functionality. The memory 214 may include any non-transitory memory and may be capable of storing data usable by the processor 212. The network access device 216 may include any port or device capable of communicating via a wired or wireless interface such as via Wi-Fi, Bluetooth, a cellular protocol, vehicle to vehicle communications, or the like. The network access device 216 may communicate with any of the sensors 206, 208, or either vehicle 100, 101.

The memory 214 may store map data corresponding to a map of the parking location 202. The processor 212 may receive information from the sensors 206, 208 (or from the vehicle 100) indicating the presence of a vehicle in one or more of the parking spots 204. As the vehicle 101 approaches the parking location 202, the processor 212 may identify which of the parking spots 204 are available and which ones are occupied. The processor may store this information in the memory 214. The processor 212 may control the network access device 216 to transmit information to the approaching vehicle 101 indicating the available parking spots 204 and their location.

If multiple vehicles are approaching the parking location 202 then the processor 212 may select one or more of the parking spots 204 for each of the vehicles to park in (and transmit the assigned parking spots to the corresponding vehicle). This may reduce the likelihood of multiple vehicles approaching the same parking spot. The processor 212 may further identify routes for each of the approaching vehicles to take that will reduce traffic at the parking location 202.

After a period of time, the vehicle 100 may transmit information to the server 210 indicating that the vehicle 100 is planning to leave the parking location 202. The processor 212 may take this information and may update the map in the memory 214 to indicate that the parking spot of the vehicle 100 will become empty. The processor 212 may further determine if multiple vehicles are leaving the parking location 202 simultaneously. If so, the processor 212 may determine routes for each of the vehicles to leave the parking location 202 that will reduce traffic at the parking location 202.

Figure 3A:
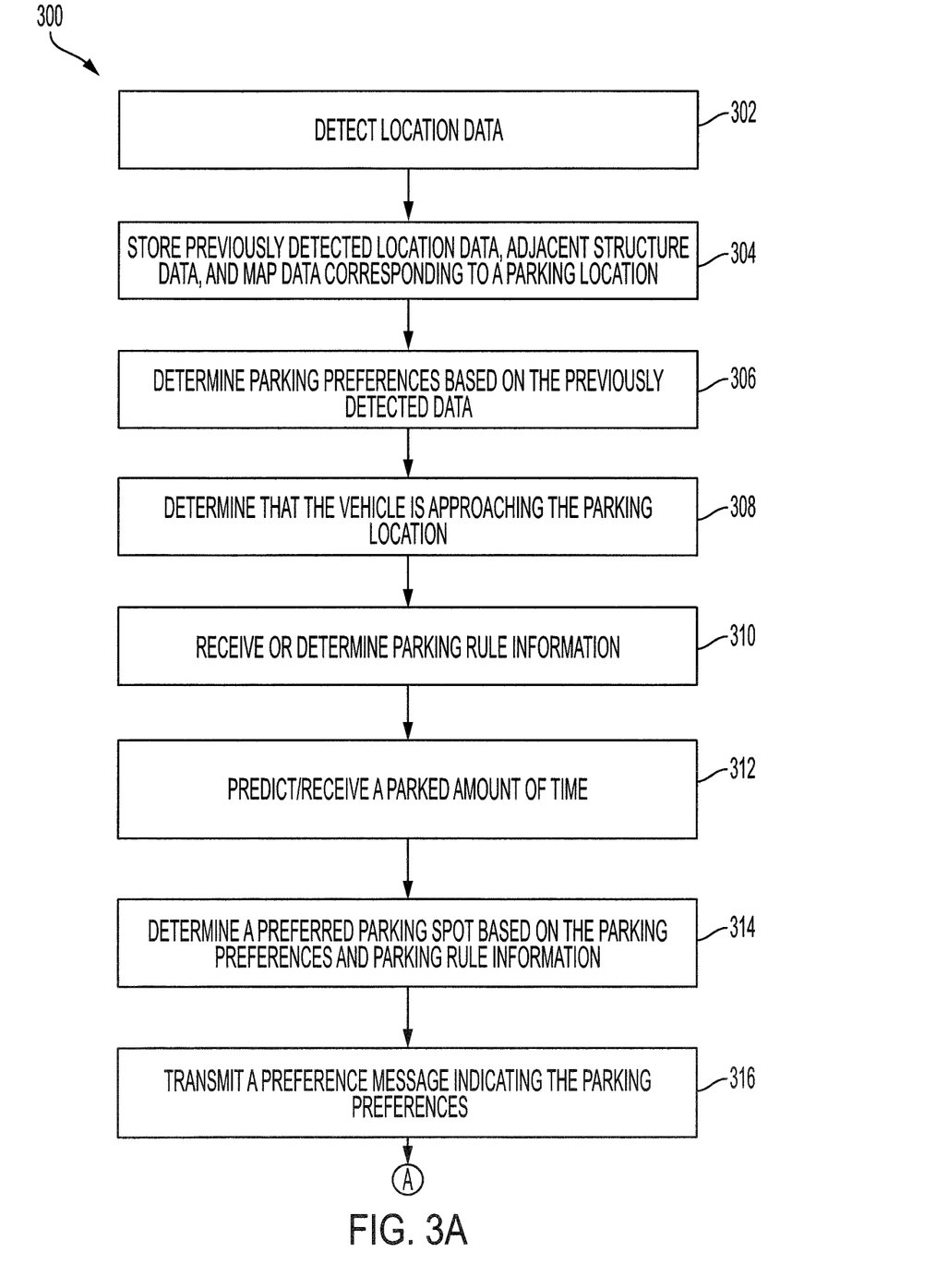
FIGS. 3A, 3B, and 3C are flowcharts illustrating a method for providing parking assistance by components of a vehicle according to an embodiment of the present invention.
Figure 3B:
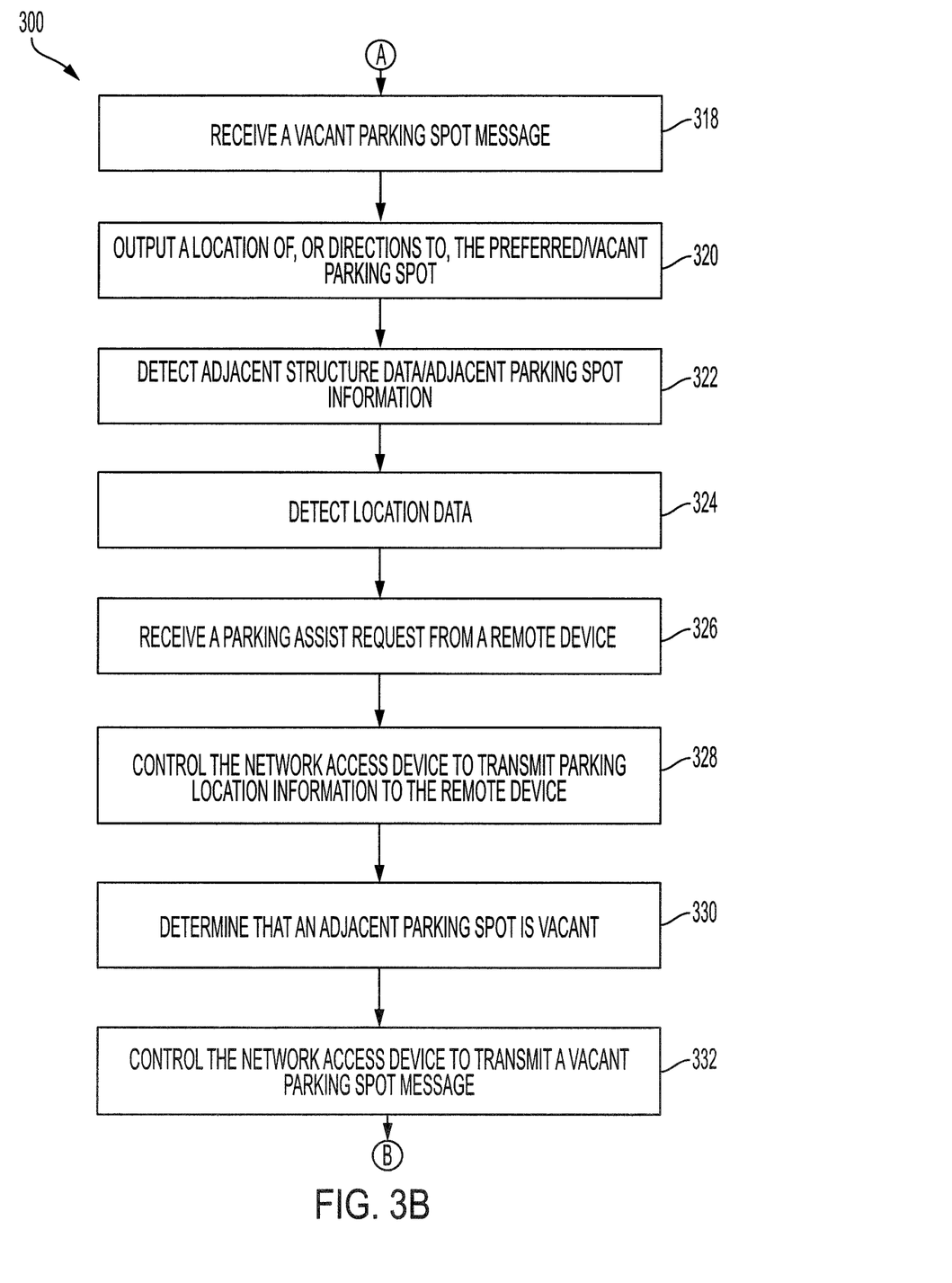
Figure 3C:
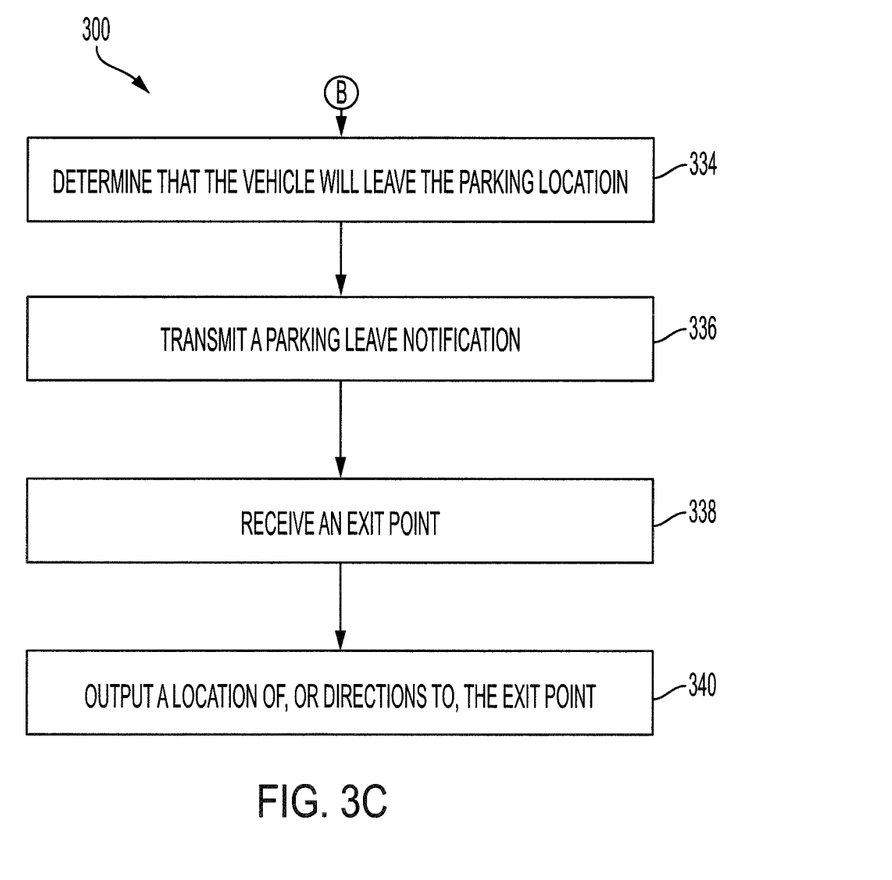

Turning now to FIGS. 3A, 3B, and 3C, a method 300 for controlling, assisting, or managing vehicle parking is shown. The system 300 may be performed by components of a vehicle such as the vehicle 100 of FIG. 1. In block 302, a location sensor of the vehicle may detect location data. The location data may include a physical location of the vehicle, a location of the vehicle on a map, a location of the vehicle relative to another known object or location, an acceleration, velocity, or heading of the vehicle, or the like.

In block 304, various data may be stored in a memory. In particular, the data may include previously detected location data, previously detected adjacent structure data, and map data corresponding to one or more parking location. The previously detected location data may include any previously detected location data such as a parking spot within the parking location, preferred parking locations, or the like. The previously detected adjacent structure data may include any information corresponding to vehicles or structures adjacent to the present vehicle. The map data may correspond to a map of one or more parking location, including location of parking spots within the one or more parking location. The memory may further store parking rules associated with a parking location. The parking rules will be discussed with more detail below.

In block 306, the ECU of the vehicle may determine parking preferences of a driver or user of the vehicle based on the previously detected and stored data. The ECU may use a machine learning algorithm, or other algorithm, and learn preferences of the driver. In some embodiments, the user may provide his or her preferences using an input device. For example, a user may provide input indicating that he or she is willing to pay a premium for better parking spots. As another example, the ECU may learn, based on previously detected parking behavior of the driver, that a driver prefers to park at a location that results in the shortest walk to the destination location. As another example, the ECU may learn that the driver prefers to avoid using stairs or escalators if possible. As yet another example, the ECU may learn that the driver prefers to park as near to an elevator as possible.

In block 308, the ECU may determine that the vehicle is approaching a specific parking location. The ECU may make this determination based on a current location of the vehicle, based on data detected by one or more sensor of the vehicle, based on a route provided by a user, based on a predicted route, or the like. For example, image data detected by the camera may indicate that the vehicle is entering a parking garage. As another example, the ECU may determine that the vehicle is nearing the end of a route. As yet another example, the network access device of the vehicle may receive a signal from a server indicating that the vehicle has entered a parking location.

In block 310, the ECU may receive or determine parking rule information. The ECU may receive the parking rule information from a server or other remote device that is associated with the parking location. The ECU may likewise receive the information from a remote server that is not associated with the parking location by transmitting the current location of the vehicle and receiving the associated parking rule in response. The ECU may determine the parking rule information based on comparing a current location of the vehicle to rule data in a memory. The ECU may likewise determine the parking rule information based on data detected by a sensor. For example, a camera may detect image data corresponding to a sign that includes rules of the parking location, and the ECU may decipher the rules based on the detected image data.

In block 312, the ECU may predict or receive a parked amount of time. The parked amount of time may correspond to an amount of time which the vehicle is likely to be parked. For example, the ECU may receive the parked amount of time via an input device from the user. As another example, the ECU may predict the parked amount of time based on previous parking habits of the user. For example, the ECU may determine that the user has parked on average at this parking location for 30 minutes at a specific time of day. If the vehicle is parked at the parking location at the specific time of day then the ECU may predict that the parked amount of time is 30 minutes.

In block 314, the ECU may determine a preferred parking spot for the vehicle based on the parking preferences determined in block 306 as well as the parking rule information determined in block 310. In some embodiments, the ECU may further determine the preferred parking spot based on the predicted or received parked amount of time. In some embodiments, the ECU may further determine the preferred parking spot based on received information corresponding to which parking spots are vacant. The ECU may determine a preferred parking spot for the vehicle that provides the greatest match between parking spot and parking preferences while satisfying the parking rule information. For example, if a first parking spot is available that satisfies all of the parking preferences but is only a 30 minute parking spot and the parked amount of time will be one hour, then the ECU may attempt to find a second parking spot that satisfies some of the parking preferences but allows for an hour of parked time.

In some embodiments, a server may determine a preferred parking spot for the vehicle. In that regard and in block 316, the ECU may transmit a preference message to the server that indicates the parking preferences determined in block 306. The server may determine which parking spots are available and may assign a parking spot to the vehicle.

In block 318, the vehicle may receive a vacant parking spot message from the server. The vacant parking spot may include a parking spot that best satisfies the parking preferences as determined by the server and that is currently vacant.

In block 320, the ECU may control an output device of the vehicle to output a location of, or directions to, the preferred or vacant parking spot. The preferred or vacant parking spot may be the spot determined by the ECU in block 314 or received from the server in block 318. The location of the parking spot may be provided in multiple ways. For example, step-by-step directions to the parking spot may be provided. As another example, a map of the parking location may be displayed with an indicator of the parking spot shown on the map.

In block 322, a sensor of the vehicle may detect adjacent structure data or adjacent parking spot information. The adjacent structure data or adjacent parking spot information may include information such as an image of an object or vehicles, or an identification of an object or vehicles, adjacent to the present vehicle. The adjacent structure data may further include information such as whether a vehicle is parked in a spot adjacent to the present vehicle, or the like.

In block 324, a location sensor of the vehicle may detect location data in a similar manner as performed in block 302.

In block 326, the vehicle may receive a parking assist request from a remote device. The parking assist request may correspond to a request to identify a current location of the vehicle in the parking location. For example, a user may use a mobile device, such as a cell phone, to transmit a message to the vehicle requesting aid in identifying the current location of the vehicle.

The ECU may determine parking location information in response to receiving the parking assist request. For example, the parking location information may include the current location of the vehicle as detected in block 324. As another example, the parking location information may include images of objects in the vicinity of the vehicle. As yet another example, the parking location information may include the location of the preferred or vacant parking spot on a map.

In block 328, the ECU may control the network access device to transmit the parking location information to the remote device. The ECU may control the network access device to transmit the parking location information in response to receiving the parking assist request in block 326.

In block 330, the ECU may determine whether an adjacent parking spot to the current parking spot is vacant or occupied. The ECU may make this determination based on data detected in block 322. For example, the ECU may analyze image data, radar data, or LIDAR data to determine whether the adjacent parking spot is vacant or occupied.

In block 332, the ECU may control the network access device to transmit a vacant parking spot message to a server or another vehicle in response to determining that an adjacent parking spot is vacant. The vacant parking spot message may include an absolute or relative location of the vacant parking spot, a size of the vacant parking spot, rules associated with the vacant parking spot, or the like.

In block 334, the ECU may determine that the vehicle will leave the parking location. For example, a user may enter the vehicle and turn it on, indicating that the vehicle will be driven away from the parking location.

In block 336, the ECU may control the network access device to transmit a parking leave notification. The parking leave notification may indicate that the vehicle will leave the parking location. In that regard, the ECU may control the network access device to transmit the parking leave notification in response to determining that the vehicle will leave the parking location.

In some embodiments, the server may control traffic flow in and out of the parking location. In that regard, the server may determine an ideal exit point for the vehicle to leave the parking location in order to reduce traffic in and around the parking location.

In block 338, the vehicle may receive the exit point from the server. In block 340, the ECU may control an output device to output a location of, or directions to, the exit point. For example, the ECU may receive the exit point and may determine directions to the exit point based on stored map data.

Figure 4A:
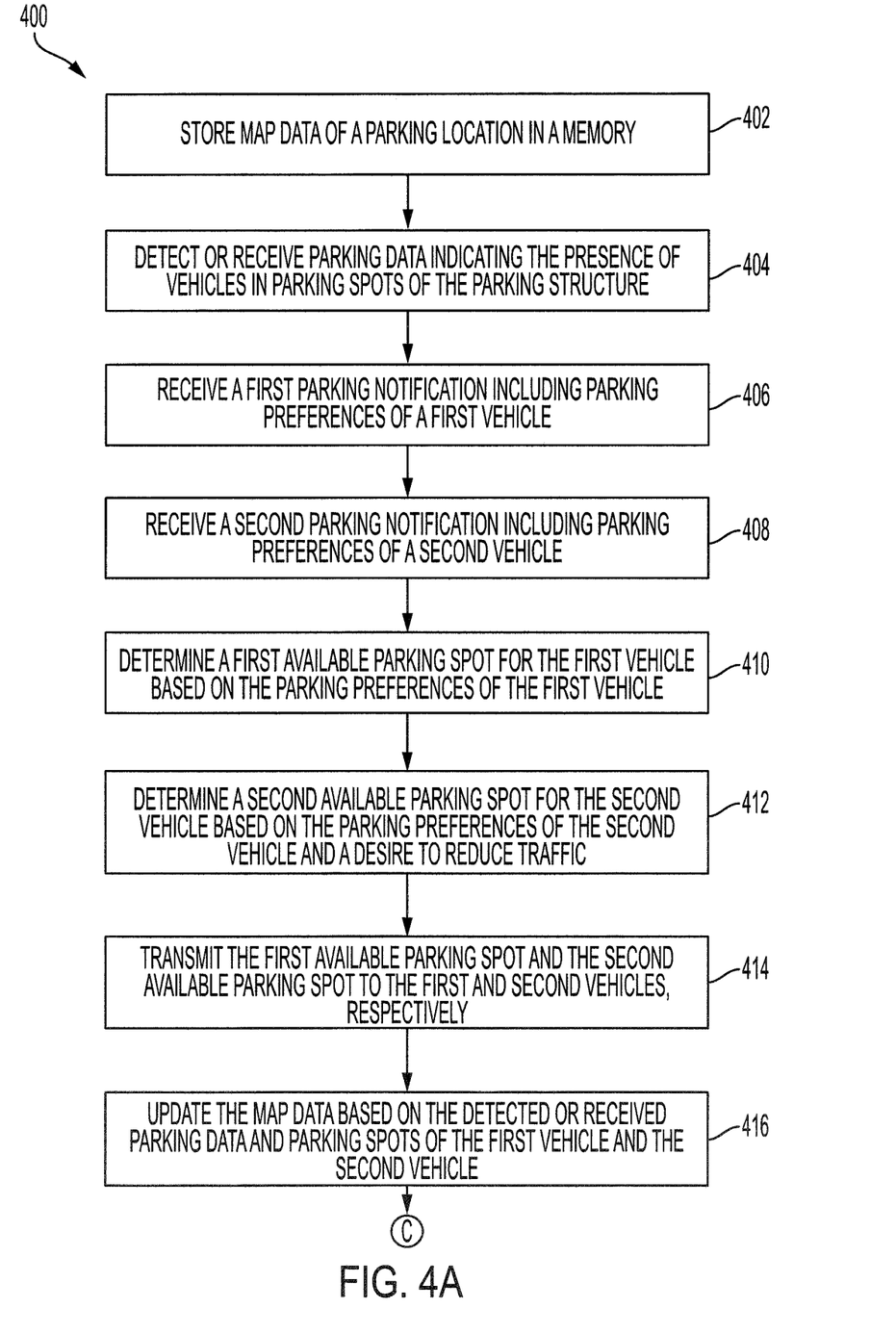
FIGS. 4A and 4B are flowcharts illustrating a method for providing parking assistance to multiple vehicles according to an embodiment of the present invention.
Figure 4B:
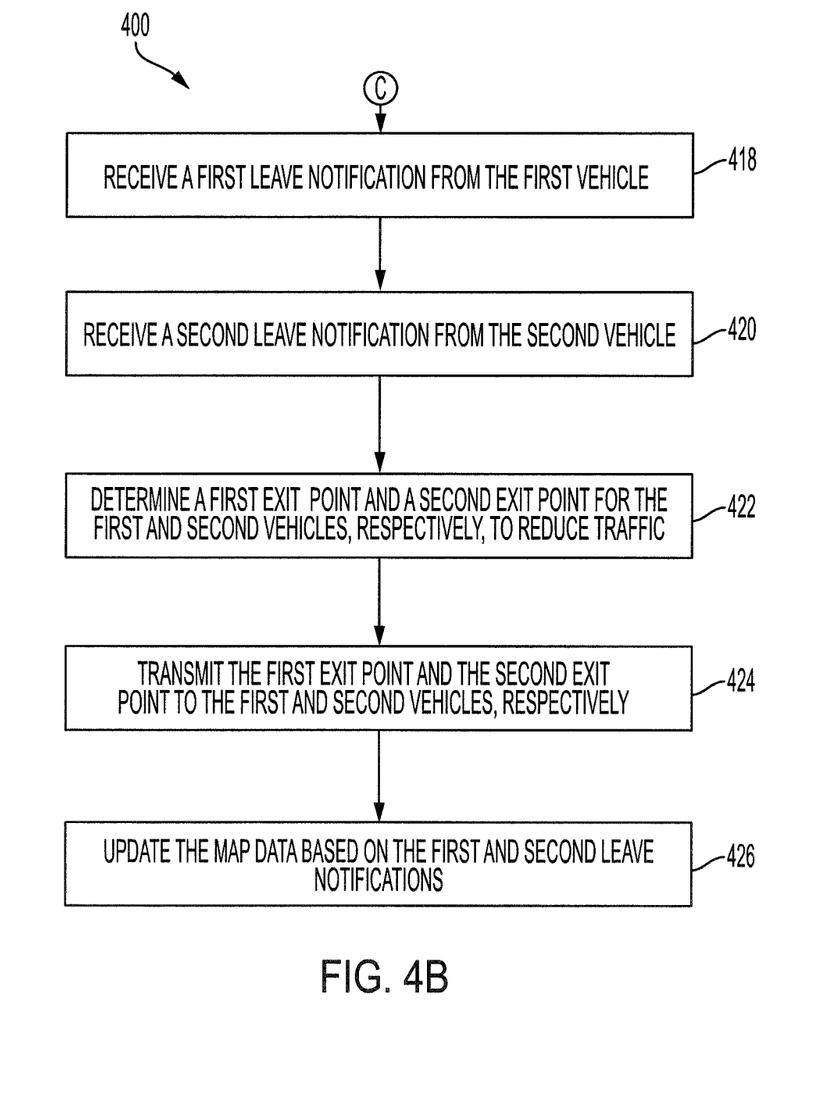

Referring now to FIGS. 4A and 4B, a method 400 for assisting vehicle parking is shown. The method may be implemented, for example, by a system similar to the system 200 of FIG. 2. In block 402, a memory may store map data corresponding to a map of a parking location. For example, the memory may be included in a parking server that is associated with the parking location. As another example, the memory may be included in a parking server that handles parking in multiple parking locations.

In block 404, parking data may be detected or received that indicate the presence of vehicles in parking spots of the parking structure. For example, the parking data may be detected and received from one or more sensor associated with the parking location. As another example, the parking data may be received from vehicles that are parked in the parking location.

In block 406, a first parking notification may be received via a network access device of the parking server. The first parking notification may indicate that a first vehicle is approaching the parking location and intends to park at the parking location. The first parking notification may further include parking preference data corresponding to the first vehicle.

In block 408, a second parking notification may be received via the network access device of the parking server. The second parking notification may indicate that a second vehicle is approaching the parking location and intends to park at the parking location. The second parking notification may further include parking preference data corresponding to the second vehicle.

In block 410, a processor of the parking server may determine a first available parking spot for the first vehicle based on the map data, the parking data, and the parking preferences of the first vehicle. For example, the parking server may determine the first available parking spot that is available and that matches the parking preferences of the first vehicle.

In block 412, the processor may determine a second available parking spot for a second vehicle based on the map data, the parking data, and the parking preferences of the second vehicle. The processor may further determine the second available parking spot based on a desire to reduce traffic at the parking location. For example, the processor may determine a second available parking spot based on an algorithm that will reduce the likelihood of the first vehicle and the second vehicle waiting for each other. The processor may further determine the first available parking spot and the second available parking spot based on an algorithm that will reduce the likelihood of traffic between the first vehicle, the second vehicle, and any other vehicle that may be entering or leaving the parking location.

In block 414, the network access device of the parking server may transmit the first available parking spot and the second available parking spot to the first and second vehicles, respectively. For example, the network access device may transmit relative locations of the first available parking spot and the second available parking spot, absolute locations to the first available parking spot and the second available parking spot, navigation instructions to the respective parking spots, or the like.

In block 416, the processor may update the map data in the memory based on the detected or received parking data and the parking spots taken by the first vehicle and the second vehicle. For example, the map may include real-time data including assignments of vehicles to parking spots as well as detected data indicating which vehicles are parked in which parking spots.

In block 418, the processor may receive a first leave notification from the first vehicle and, in block 420, may receive a second leave notification from the second vehicle. The first leave notification and the second leave notification may indicate that the first vehicle and the second vehicle, respectively, plan to leave the parking location.

In block 422, the processor may determine a first exit point and a second exit point for the first and second vehicles, respectively, to leave the parking location. The first exit point may correspond to a location at which the first vehicle should exit the parking location and the second exit point may correspond to a location at which the second vehicle should exit the parking location. The processor may determine the first exit point and the second exit point in such a way so as to reduce traffic at the parking location. For example, the processor may alternate assigning exit points between two exit points, may determine routes between exit points that will reduce traffic, or the like.

In block 424, the processor may control the network access device to transmit the first exit point and the second exit point to the first and second vehicles, respectively. For example, the processor may just transmit the locations of the first and second exit points, may transmit navigation directions to the first and second exit points, or the like.

In block 426, the processor may update the map data in the memory based on the first and second leave notifications. For example, the processor may update the map data to indicate that the parking spots of the first vehicle and the second vehicle are now vacant. In some embodiments, the processor may wait to update the map data until one or more sensor indicates that the respective parking spots are available.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for locating a parked vehicle comprising:
a main body configured to support at least one driver or passenger; a sensor located in or on the main body and configured to detect adjacent structure data including image data corresponding to an adjacent vehicle or structure adjacent to the main body;
a network access device located in or on the main body and configured to transmit and receive data including receiving a parking assist request from a remote mobile device corresponding to a request to identify a current location of the main body; and
an electronic control unit (ECU) located in or on the main body, coupled to the sensor and the network access device, and configured to:
receive the parking assist request from the network access device; and
control the network access device to transmit parking location information corresponding to the adjacent vehicle or structure and including the image data to the remote mobile1 device in response to receiving the parking assist request, the parking location information being usable to locate the main body.

2. The system of claim 1 further comprising:
a location sensor configured to detect location data corresponding to a current location of the main body;
a memory configured to store previously detected location data, previously detected adjacent structure data, and map data corresponding to a parking location and including multiple parking spots; and
an output device configured to output data,
wherein the ECU is configured to:
determine parking preferences of a driver based on at least one of the previously detected location data or the previously detected adjacent structure data,
determine that the main body is approaching the parking location; determine a preferred parking spot based on the determined parking preferences and the stored map data, and
control the output device to output data corresponding to a location of the preferred parking spot.

3. The system of claim 1 wherein the sensor is further configured to detect adjacent parking spot information corresponding to whether an adjacent parking spot located adjacent to the main body is occupied or vacant, and the ECU is further configured to:
determine that the adjacent parking spot is vacant based on the adjacent parking spot information; and
control the network access device to transmit a vacant parking spot message corresponding to a location of the adjacent parking spot via the network access device.

4. The system of claim 1 further comprising an output device configured to output data, wherein the network access device is further configured to receive a vacant parking spot message indicating that a parking spot is available and including location information corresponding to the parking spot, and the ECU is further configured to control the output device to output at least one of the location information or navigation instructions to the parking spot.

5. The system of claim 1 further comprising a location sensor configured to detect a current location of the main body, wherein the ECU is further configured to control the network access device to transmit the current location of the main body to the remote mobile device in response to receiving the parking assist request.

6. The system of claim 1 further comprising an output device configured to output data, wherein the network access device is further configured to receive parking rule information
corresponding to at least one rule of a current parking location, and the ECU is further configured to:
   determine that the main body is in or approaching the current parking location; and
   control the output device to output the at least one rule of the current parking location in response to determining that the main body is in or approaching the current parking location.

7. The system of claim 1 further comprising:
an output device configured to output data,
wherein the sensor includes a camera configured to detect the image data that further includes image data corresponding to at least one sign associated with a current parking location, and the ECU is further configured to:
   determine that the main body is in or approaching the current parking location,
   determine parking rule information corresponding to at least one rule of the current parking location based on the detected image data, and
   control the output device to output the at least one rule of the current parking location in response to determining that the main body is in or approaching the current parking location.

8. The system of claim 1 further comprising an output device configured to output data and an input device configured to receive input data, wherein the ECU is further configured to:
   receive premium parking preferences via the input device that indicates whether a driver is willing to pay a premium for a specific parking spot or type of parking spot;
   control the network access device to transmit a message indicating that the driver is willing to pay the premium for the specific parking spot or type of parking spot based on the premium parking data;
   receive premium parking spot location information corresponding to a location of the specific parking spot or type of parking spot; and
   control the output device to output the location of the specific parking spot or type of parking spot.

9. A method for locating a parked vehicle comprising:
   detecting, by a sensor of the vehicle, adjacent structure data including image data corresponding to an adjacent vehicle or structure adjacent to a main body of the vehicle;
   receiving, by a network access device of the vehicle, a parking assist request from a remote mobile device corresponding to a request to identify a current location of the main body; and
   controlling, by an electronic control unit (ECU), the network access device to transmit parking location information corresponding to the adjacent vehicle or structure and including the image data to the remote mobile device in response to receiving the parking assist request, the parking location information being usable to locate the main body.

10. The method of claim 9 further comprising:
   detecting, by a location sensor, location data corresponding to a current location of the main body;
   storing, in a memory, previously detected location data, previously detected adjacent structure data, and map data corresponding to a parking location and including multiple parking spots;
   determining, by the ECU, parking preferences of a driver based on at east one of the previously detected location data or the previously detected adjacent structure data;
   determining, by the ECU, that the main body is approaching the parking location;
   determining, by the ECU, a preferred parking spot based on the determined parking preferences and the stored map data; and
   controlling, by the ECU, an output device to output data corresponding to a location of the preferred parking spot.

11. The method of claim 9 further comprising:
   detecting, by the sensor, adjacent parking spot information corresponding to whether an adjacent parking spot located adjacent to the main body is occupied or vacant;
   determining, by the ECU, that the adjacent parking spot is vacant based on the adjacent parking spot information; and
   controlling, by the ECU, the network access device to transmit a vacant parking spot message corresponding to a location of the adjacent parking spot via the network access device.

12. The method of claim 9 further comprising:
   receiving, by the network access device, a vacant parking spot message indicating that a parking spot is available and including location information corresponding to the parking spot; and
   controlling, by the ECU, an output device to output at least one of the location information or navigation instructions to the parking spot.

13. The method of claim 9 further comprising: detecting, by a location sensor, a current location of the main body; and
   controlling, by the ECU, the network access device to transmit the current location of the main body to the remote mobile device in response to receiving the parking assist request.

14. The method of claim 9 further comprising:
   receiving, by the network access device, parking rule information corresponding to at least one rule of a current parking location:
   determining, by the ECU, that the main body is in or approaching the current parking location; and
   controlling, by the ECU, an output device to output the at least one rule of the current parking location in response to determining that the main body is in or approaching the current parking location.

* * * * *

UNITED STATES PATENT AND TRADEMARK OFFICE
CERTIFICATE OF CORRECTION

PATENT NO. : 10,733,891 B2  
APPLICATION NO. : 16/181193  
DATED : August 4, 2020  
INVENTOR(S) : Justin J. Chow Page 1 of 1

It is certified that error appears in the above-identified patent and that said Letters Patent is hereby corrected as shown below:

In the Claims

Column 12, Line 24, Claim 1, after the word "mobile", delete "1".

Signed and Sealed this  
Third Day of June, 2025

Coke Morgan Stewart  
*Acting Director of the United States Patent and Trademark Office*